United States Patent
Hu et al.

(10) Patent No.: US 11,265,931 B2
(45) Date of Patent: Mar. 1, 2022

(54) METHOD AND DEVICE FOR ESTABLISHING CONNECTION

(71) Applicant: CHINA ACADEMY OF TELECOMMUNICATIONS TECHNOLOGY, Beijing (CN)

(72) Inventors: Weiqi Hu, Beijing (CN); Zhimi Cheng, Beijing (CN); Hui Xu, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 117 days.

(21) Appl. No.: 16/475,677

(22) PCT Filed: Feb. 7, 2018

(86) PCT No.: PCT/CN2018/075570
§ 371 (c)(1),
(2) Date: Jul. 2, 2019

(87) PCT Pub. No.: WO2018/127224
PCT Pub. Date: Jul. 12, 2018

(65) Prior Publication Data
US 2019/0350016 A1    Nov. 14, 2019

(30) Foreign Application Priority Data
Jan. 3, 2017 (CN) .................... 201710002247.0

(51) Int. Cl.
*H04W 76/10* (2018.01)
*H04L 61/5007* (2022.01)
(Continued)

(52) U.S. Cl.
CPC ......... *H04W 76/10* (2018.02); *H04L 61/2007* (2013.01); *H04W 8/20* (2013.01); *H04W 84/042* (2013.01)

(58) Field of Classification Search
CPC ..... H04W 76/10; H04W 8/20; H04W 84/042; H04W 8/18; H04W 48/18; H04L 61/2007
See application file for complete search history.

(56) References Cited

U.S. PATENT DOCUMENTS 6,469,998 B1 * 10/2002 Burgaleta Salinas ....................... H04L 29/12216
370/338
9,392,522 B2 * 7/2016 Stojanovski .......... H04W 48/17
(Continued)

FOREIGN PATENT DOCUMENTS

| CN | 103379578 A | 10/2013 |
|---|---|---|
| CN | 105490945 A | 4/2016 |
| CN | 108235376 A | 6/2018 |

OTHER PUBLICATIONS

International Preliminary Report on Patentability of the International Search Authority for PCT/CN2018/075570 dated Jul. 9, 2019 and its English translation provided by WIPO.
(Continued)

*Primary Examiner* — Christine Ng
(74) *Attorney, Agent, or Firm* — Ladas & Parry, LLP

(57) ABSTRACT

A method and a device for establishing connection are provided. The method for establishing connection is applied to a mobility management functional entity and includes: acquiring path selection reference information when a user equipment UE accesses a wireless network; and selecting a session management functional entity and/or a user plane anchor for the user equipment based on the path selection reference information.

18 Claims, 9 Drawing Sheets

---

101 — Acquiring path selection reference information when a UE accesses a wireless network 102 — Selecting a session management functional entity and/or a user plane anchor for the UE based on the path selection reference information

(51) Int. Cl.
*H04W 8/20* (2009.01)
*H04W 84/04* (2009.01)

(56) References Cited

U.S. PATENT DOCUMENTS

| | | | | |
|---|---|---|---|---|
| 2009/0270026 | A1* | 10/2009 | Shin | H04W 52/0254 455/3.01 |
| 2012/0220326 | A1* | 8/2012 | Li | H04W 4/70 455/509 |
| 2014/0153546 | A1 | 6/2014 | Kim et al. | |
| 2015/0105075 | A1* | 4/2015 | Yu | H04L 61/6054 455/435.2 |
| 2017/0150420 | A1* | 5/2017 | Olsson | H04W 8/06 |
| 2017/0310592 | A1* | 10/2017 | Synnergren | H04L 45/38 |
| 2018/0042057 | A1* | 2/2018 | Johansson | H04W 72/04 |
| 2018/0206107 | A1* | 7/2018 | Koshimizu | H04W 8/20 |
| 2019/0141583 | A1* | 5/2019 | Ying | H04W 36/385 |
| 2019/0191297 | A1* | 6/2019 | Huang | H04W 76/27 |
| 2019/0306758 | A1* | 10/2019 | Ma | H04W 76/12 |
| 2020/0120570 | A1* | 4/2020 | Youn | H04W 36/0033 |

OTHER PUBLICATIONS

International Search Report for PCT/CN2018/075570 dated Apr. 28, 2018 and its English translation provided by WIPO.
Written Opinion for PCT/CN2018/075570 dated Apr. 28, 2018 and its English translation provided by WIPO.
First office action Chinese patent application 201710002247.0 dated Dec. 26, 2018.
Second office action Chinese patent application 201710002247.0 dated Jun. 19, 2019.
"3rd Generation Partnership Project; Technical Specification Group Services and System Aspects; Study on Architecture for Next Generation System" 3GPP TR 23.799 V0.7.0 (Aug. 2016).
3rd Generation Partnership Project; Technical Specification Group Services and System Aspects; Study on Architecture for Next Generation System (Release 14) TR 23.799 V14.0.0.

* cited by examiner

METHOD AND DEVICE FOR ESTABLISHING CONNECTION

CROSS-REFERENCE TO RELATED APPLICATIONS

The present application is a U.S. national phase application of a PCT Application No. PCT/CN2018/075570 filed on Feb. 7, 2018, which claims priority from Chinese Patent Application No. 201710002247.0 filed in China on Jan. 3, 2017, the entire content of which is are incorporated herein by reference in their entireties.

FIELD OF THE INVENTION

The present disclosure relates to the technical field of communications, and in particular to a method and a device for establishing connection.

BACKGROUND OF THE INVENTION

Separation of control and forwarding means that a control function and a forwarding function of a mobile network are logically separated, and the corresponding functions are realized by different logical network elements respectively, thereby realizing centralized function control, flexible resource allocation, flexible service deployment, and separate evolutions of a control plane and a user plane, etc.

Specifically, the control function is realized by a centralized controller to implement policy control, traffic scheduling, connection management, mobility management and other functions. In a variety of applications, network routing and transport rules and policies may be defined based on service characteristics without being dependent on the resources, performances and other constraints of the underlying forwarding device. Therefore, differences among underlying network devices are shielded, thus being more flexible, intelligent, and adaptable to changes.

The user plane as separated can be deployed in a distributed manner according to the service requirements, and various processing and forwarding actions including routing, modification, statistics and the like on the user messages are efficiently performed in response to instructions from the control plane, thus presenting characteristics such as being simple, efficient, and stable.

Currently, in the Evolved Packet System (EPS), the mobility management entity (MME) supports both mobility management (MM) functions and session management (SM) functions. The MM functions are, for example, attaching, tracking area updating or the like. The SM functions are, for example, establishment, modification, deletion or the like of a public data network connection. The MM message and the SM message sent by the user equipment (UE) are both terminated in the MME and processed by the MME.

In order to improve the modularity degree of the network, the MM (Mobility Management) functional entity and the SM (Session Management) functional entity exist, as two independent function modules, in the 5G network. The MM functional entity is mainly used for user registration, UE-unreachable discovery, location registration, UE status transition, mobility of connection status and inactive status, UE mobility restriction, UE mobility management control, anchor selection, user plane path establishment, etc. The SM functional entity is mainly used for data packet forwarding and detection, session control, user plane function selection, IP address allocation (a connection type being IP) for the UE and the like.

When the UE accesses a network wirelessly, the UE is first connected to the MM functional entity. The MM functional entity is responsible for receiving an MM message and an SM message. Then, the MM functional entity selects an SM functional entity for connection with the UE. However, there exists a problem in the related art that data transmission path optimization is not considered in a case that the MM functional entity selects the SM functional entity for the UE.

SUMMARY OF THE INVENTION

In view of this, a method and a device for establishing connection are provided by the present disclosure in order to optimize data transmission path.

In order to solve the above technical problem, a method for establishing connection is provided, the method being applied to a mobility management functional entity and including:

acquiring path selection reference information when a user equipment (UE) accesses a wireless network; and selecting a session management functional entity and/or a user plane anchor for the UE based on the path selection reference information.

The path selection reference information includes path optimization reference information, or the path selection reference information includes path optimization reference information and user subscription information.

In a case that the path selection reference information includes the path optimization reference information, the step of acquiring the path selection reference information includes:

acquiring path optimization reference information of a network to be accessed by the UE.

In a case that the path selection reference information includes the path optimization reference information and the user subscription information, the step of acquiring the path selection reference information includes:

receiving an attach request message from the UE;

acquiring user subscription information of the UE based on the attach request message; and acquiring path optimization reference information of a network to be accessed by the UE.

The step of selecting a session management functional entity and/or a user plane anchor for the UE based on the path selection reference information includes:

selecting the session management functional entity for the UE based on the path selection reference information; or selecting the user plane anchor for the UE based on the path selection reference information, and selecting the session management functional entity based on the information about the user plane anchor; or selecting both the user plane anchor and the session management functional entity for the UE based on the path selection reference information.

The method further includes:

sending information related to session management to the session management functional entity; or sending the information related to session management and information about the user plane anchor to the session management functional entity, wherein the session management functional entity selects the user plane anchor for the UE based on the information about the user plane anchor, and establishes a session connection for the UE based on the information related to session management.

The method further includes:
receiving a session establishment response message sent by the session management functional entity; and
sending an attach accept message to the UE.
The method further includes:
receiving a detach request message from the UE;
sending a session deletion request message to the session management functional entity based on the detach request message;
receiving a session deletion response message sent by the session management functional entity; and
sending a detach accept message to the UE based on the session deletion response message, and deleting a signaling connection with the UE.

In a second aspect, a method for establishing connection is provided by the present disclosure, the method being applied to a session management functional entity, the session management functional entity being selected by a mobility management functional entity based on acquired path selection reference information when a user equipment (UE) accesses a wireless network. The method includes:
receiving information related to session management sent by the mobility management functional entity;
determining a user plane anchor for the UE being about to access the network; and
establishing a session connection for the UE based on the information related to session management.

The step of determining a user plane anchor for the UE being about to access the network includes:
determining a user plane anchor for the UE based on the information related to session management; or
receiving information about a user plane anchor sent by the mobility management functional entity, and determining the user plane anchor for the UE based on the information about the user plane anchor.

The step of establishing a session connection for the UE based on the information related to session management includes:
allocating an Internet Protocol (IP) address, creating a UE context for the UE, and generating a user plane configuration instruction, based on the information related to session management; and
sending a user plane establishment request message to the user plane anchor, wherein the user plane establishment request message includes the user plane configuration instruction, and the user plane anchor configures data routing or data forwarding rules based on the user plane configuration instruction.

The method further includes:
receiving a user plane establishment completion message sent by the user plane anchor; and
sending a session establishment response message to the mobility management functional entity.

The method further includes:
receiving a session deletion request message sent by the mobility management functional entity;
deleting information on the UE context based on the session deletion request message, and sending a user plane deletion request message to the user plane anchor;
receiving a user plane deletion completion message sent by the user plane anchor; and
sending a session deletion response message to the mobility management functional entity based on the user plane deletion completion message.

In a third aspect, a method for establishing connection is provided by the present disclosure, the method being applied to a user plane anchor, the user plane anchor being selected by a mobility management functional entity based on acquired path selection reference information when a user equipment (UE) accesses a wireless network, or the user plane anchor being selected by a session management functional entity based on information related to session management sent from the mobility management functional entity. The method includes:
when the UE accesses the wireless network, receiving a user plane establishment request message sent by the session management functional entity, wherein the user plane establishment request message includes a user plane configuration instruction; and
configuring data routing or data forwarding rules for the UE based on the user plane configuration instruction.

The method further includes:
sending a user plane establishment completion message to the session management functional entity.

The method further includes:
receiving a user plane deletion request message sent by the session management functional entity;
deleting a user plane based on the user plane deletion request message; and
sending a user plane deletion completion message to the session management functional entity.

In a fourth aspect, a device for establishing connection is provided by the present disclosure, the device being arranged in a mobility management functional entity and including:
an acquiring module, configured to acquire path selection reference information when a user equipment (UE) accesses a wireless network; and
a selecting module, configured to select a session management functional entity and/or a user plane anchor for the UE based on the path selection reference information.

The path selection reference information includes path optimization reference information, or the path selection reference information includes path optimization reference information and user subscription information.

In a case that the path selection reference information includes the path optimization reference information, the acquiring module is specifically configured to acquire path optimization reference information of a network to be accessed by the UE.

In a case that the path selection reference information includes the path optimization reference information and the user subscription information, the acquiring module includes:
a receiving submodule, configured to receive an attach request message from the UE;
a first acquiring submodule, configured to acquire user subscription information of the UE based on the attach request message; and
a second acquiring submodule, configured to acquire path optimization reference information of a network to be accessed by the UE.

The selecting module is specifically configured to:
select the session management functional entity for the UE based on the path selection reference information; or
select the user plane anchor for the UE based on the path selection reference information, and select the session management functional entity based on the information about the user plane anchor; or
select both the user plane anchor and the session management functional entity for the UE based on the path selection reference information.

The device further includes a first sending module configured to:

send information related to session management to the session management functional entity; or send the information related to session management and information about the user plane anchor to the session management functional entity, wherein the session management functional entity selects the user plane anchor for the UE based on the information about the user plane anchor, and establishes a session connection for the UE based on the information related to session management.

The device further includes a first receiving module configured to:

receive a session establishment response message sent by the session management functional entity.

The first sending module is further configured to send an attach accept message to the UE.

The device further includes:

a second receiving module, configured to receive a detach request message from the UE; and a second sending module, configured to send a session deletion request message to the session management functional entity based on the detach request message.

The second receiving module is further configured to receive a session deletion response message sent by the session management functional entity.

The second sending module is further configured to send a detach accept message to the UE based on the session deletion response message, and delete a signaling connection with the UE.

In a fifth aspect, a device for establishing connection is provided by the present disclosure, the device being arranged in a session management functional entity, the session management functional entity being selected by a mobility management functional entity based on acquired path selection reference information when a user equipment (UE) accesses a wireless network. The device includes:

a receiving module, configured to receive information related to session management sent by the mobility management functional entity;

a determining module, configured to determine a user plane anchor for the UE being about to access a network; and an establishing module, configured to establish a session connection for the UE based on the information related to session management.

The determining module is specifically configured to:

determine a user plane anchor for the UE based on the information related to session management; or receive information about a user plane anchor sent by the mobility management functional entity, and determine the user plane anchor for the UE based on the information about the user plane anchor.

The establishing module includes:

a configuring submodule, configured to allocate an Internet Protocol (IP) address, create a UE context for the UE, and generate a user plane configuration instruction, based on the information related to session management; and a sending submodule, configured to send a user plane establishment request message to the user plane anchor, wherein the user plane establishment request message includes the user plane configuration instruction, and the user plane anchor configures data routing or data forwarding rules based on the user plane configuration instruction.

The device further includes:

a first receiving module, configured to receive a user plane establishment completion message sent by the user plane anchor; and a first sending module, configured to send a session establishment response message to the mobility management functional entity.

The device further includes:

a second receiving module, configured to receive a session deletion request message sent by the mobility management functional entity; and a second sending module, configured to delete information on the UE context based on the session deletion request message, and send a user plane deletion request message to the user plane anchor.

The second receiving module is further configured to receive a user plane deletion completion message sent by the user plane anchor.

The second sending module is further configured to send a session deletion response message to the mobility management functional entity based on the user plane deletion completion message.

In a sixth aspect, a device for establishing connection is provided by the present disclosure, the device being arranged in a user plane anchor, the user plane anchor being selected by a mobility management functional entity based on acquired path selection reference information when a user equipment (UE) accesses a wireless network, or the user plane anchor being selected by a session management functional entity based on information related to session management sent from the mobility management functional entity. The device includes:

a receiving module, configured to receive, when the UE accesses the wireless network, a user plane establishment request message sent by the session management functional entity, wherein the user plane establishment request message includes a user plane configuration instruction; and a configuring module, configured to configure data routing or data forwarding rules for the UE based on the user plane configuration instruction.

The device further includes:

a first sending module, configured to send a user plane establishment completion message to the session management functional entity.

The receiving module is further configured to receive a user plane deletion request message sent by the session management functional entity.

The device further includes:

a deleting module, configured to delete a user plane based on the user plane deletion request message; and a second sending module, configured to send a user plane deletion completion message to the session management functional entity.

A device for establishing connection is further provided according to an embodiment of the present disclosure, the device being arranged in a mobility management functional entity, the device including a processor and a storage, wherein the processor is configured to execute a computer program stored in the storage so as to: acquire path selection reference information when a user equipment (UE) accesses a wireless network; and select a session management functional entity and/or a user plane anchor for the UE based on the path selection reference information. A device for establishing connection is further provided according to an embodiment of the disclosure, the device being arranged in a session management functional entity, the session management functional entity being selected by a mobile management functional entity based on acquired path selection reference information when a user equipment (UE) accesses a wireless network, the device including a processor and a storage. The processor is configured to execute a computer program stored in the storage so as to: receive information related to session management sent by the mobility management functional entity; determine a user plane anchor for the UE being about to access the network; and establish a session connection for the UE based on the information related to session management.

A device for establishing connection is further provided according to an embodiment of the disclosure, the device being arranged in a user plane anchor, the user plane anchor being selected by a mobility management functional entity based on acquired path selection reference information when a user equipment (UE) accesses a wireless network, or the user plane anchor being selected by a session management functional entity based on the information related to session management sent from the mobility management functional entity. The device includes a processor and a storage. The processor is configured to execute a computer program stored in the storage so as to: when the UE accesses the wireless network, receive a user plane establishment request message sent by the session management functional entity, wherein the user plane establishment request message includes a user plane configuration instruction; and configure data routing or data forwarding rules for the UE based on the user plane configuration instruction.

A computer readable storage medium is further provided according to an embodiment of the disclosure, including a computer program stored on the computer readable storage medium. When the computer program is executed by a processor, the processor implements any one of the above methods for establishing connection applied to a mobility management functional entity.

A computer readable storage medium is further provided according to an embodiment of the disclosure, including a computer program stored on the computer readable storage medium. When the computer program is executed by a processor, the processor implements any one of the above methods for establishing connection applied to the session management functional entity.

A computer readable storage medium is further provided according to an embodiment of the disclosure, including a computer program stored on the computer readable storage medium. When the computer program is executed by a processor, the processor implements any one of the above methods for establishing connection applied to a user plane anchor.

The advantageous effects of the above technical solutions according to the present disclosure are described as follows.

In the embodiments of the present disclosure, when the UE accesses the wireless network, path selection reference information is acquired, and a session management functional entity and/or a user plane anchor are selected for the UE based on the path selection reference information. In the embodiments of the present disclosure, the path selection reference information is taken into consideration when selecting the SM functional entity. Therefore, the selected SM functional entity better meets a requirement of path optimization, thereby optimizing the data transmission path.

DETAILED DESCRIPTION OF THE EMBODIMENT(S) OF THE INVENTION

Specific embodiments of the present disclosure will be further described in detail below with reference to the drawings and the embodiments. The following embodiments are used to illustrate the present disclosure, rather than limiting the scope of the present disclosure.

First Embodiment

Figure 1:
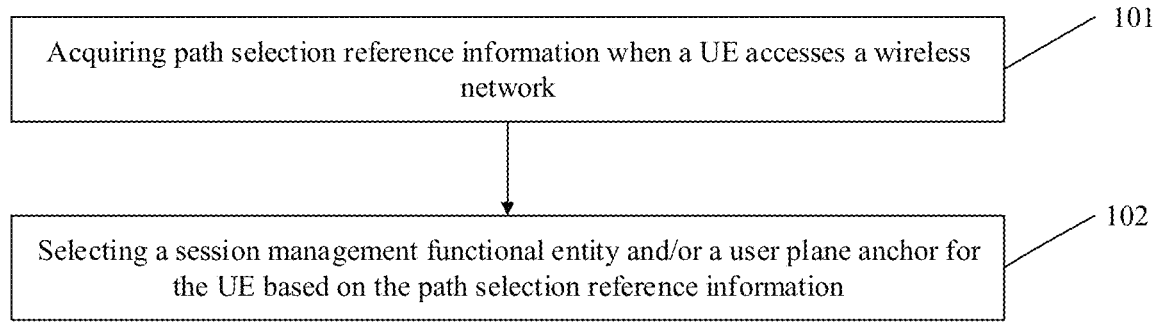
FIG. 1 is a flowchart of a method for establishing connection according to a first embodiment of the present disclosure.

As shown in FIG. 1, a method for establishing connection according to a first embodiment of the present disclosure is applied to a mobility management functional entity, such as an MM functional entity. The method includes steps 101 to 102.

In step 101, when a user equipment (UE) accesses a wireless network, path selection reference information is acquired.

In the embodiment of the present disclosure, the path selection reference information includes path optimization reference information. Alternatively, the path selection reference information includes path optimization reference information and user subscription information.

The path optimization reference information includes but is not limited to, domain name system (DNS) information, off-load capability of a local service center and the like. The user subscription information includes but is not limited to user attributes, required bandwidth, application identifier and the like.

In a case that the path selection reference information includes the path optimization reference information, the MM functional entity acquires the path optimization reference information of a network to be accessed by the UE, based on characteristics and parameters of the network itself.

In a case that the path selection reference information includes the path optimization reference information and the user subscription information, the MM functional entity receives an attach request message from the UE, and acquires the user subscription information of the UE based on the attach request message. Meanwhile, the MM functional entity acquires the path optimization reference information of a network to be accessed by the UE, based on characteristics and parameters of the network itself.

In step 102, a session management functional entity and/or a user plane anchor are selected for the UE based on the path selection reference information.

In the embodiment of the present disclosure, the MM functional entity may select a session management functional entity for the UE based on the path selection reference information, and the session management functional entity selects a user plane anchor for the UE. Alternatively, the MM functional entity selects a user plane anchor for the UE based on the path selection reference information, and then selects a session management functional entity based on information (such as location information of the user anchor and the like) about the user plane anchor. Alternatively, the MM functional entity selects both a user plane anchor and a session management functional entity for the UE based on the path selection reference information.

It can be seen from the above that in the embodiment of the present disclosure, when the UE accesses the wireless network, path selection reference information is acquired, and a session management functional entity and/or a user plane anchor are selected for the UE based on the path selection reference information. In the embodiment of the present disclosure, the path selection reference information is taken into consideration when selecting the SM functional entity. Therefore, the selected SM functional entity can better meet a requirement of path optimization, thereby optimizing the data transmission path.

Second Embodiment

Figure 2:
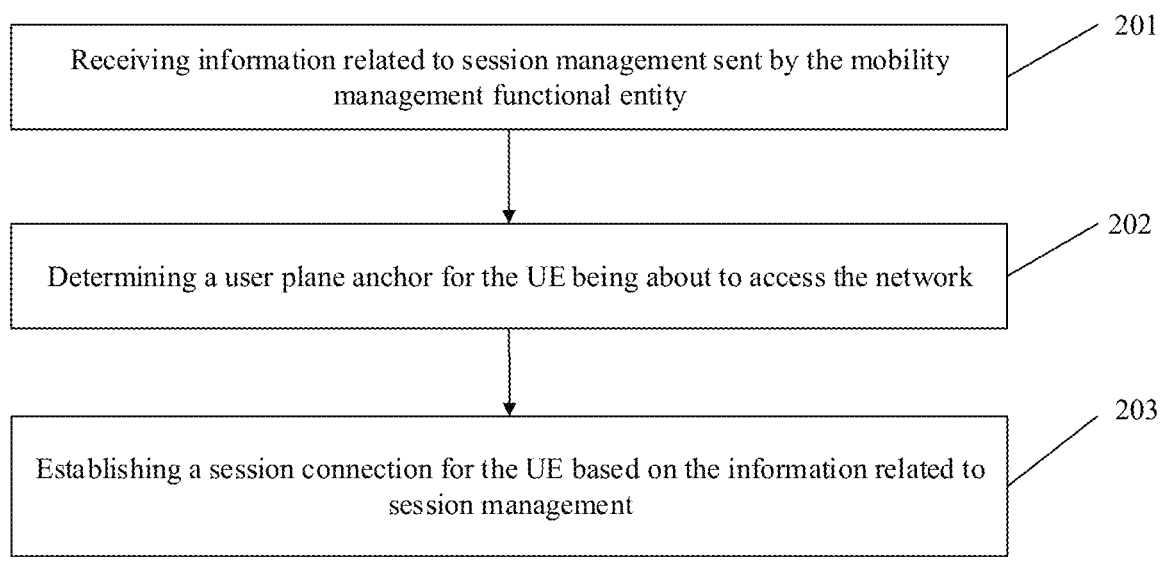
FIG. 2 is a flowchart of a method for establishing connection according to a second embodiment of the present disclosure.

As shown in FIG. 2, a method for establishing connection according to a second embodiment of the present disclosure is applied to a session management functional entity, such as an SM functional entity. The session management functional entity is selected by a mobility management functional entity based on acquired path selection reference information when a UE accesses a wireless network. The method includes steps 201 to 203.

In step 201, information related to session management sent by the mobility management functional entity is received.

In step 202, a user plane anchor is determined for the UE being about to access the network.

In the embodiment of the present disclosure, the SM functional entity may determine a user plane anchor for the UE in the following manners.

In a first manner, a user plane anchor is determined for the UE based on the information related to session management.

In a second manner, information about a user plane anchor sent by the mobility management functional entity is received, and a user plane anchor is determined for the UE based on the information about the user plane anchor, such as location information of the user anchor. That is, in the second manner, the user plane anchor is determined by the mobility management functional entity, and the SM functional entity selects a corresponding user plane anchor just based on the user plane anchor already determined by the mobility management functional entity.

In step 203, a session connection is established for the UE based on the information related to session management.

In step 203, the SM functional entity allocates an Internet Protocol (IP) address, creates a UE context for the UE, and generates a user plane configuration instruction, based on the information related to session management. Then, the SM functional entity sends a user plane establishment request message to the user plane anchor. The user plane establishment request message includes the user plane configuration instruction. The user plane anchor configures data routing or data forwarding rules based on the user plane configuration instruction.

It can be seen from the above that in the embodiment of the present disclosure, when the UE accesses the wireless network, path selection reference information is acquired, and a session management functional entity and/or a user plane anchor are selected for the UE based on the path selection reference information. In the embodiment of the present disclosure, the path selection reference information is taken into consideration when selecting the SM functional entity. Therefore, the selected SM functional entity can better meet a requirement of path optimization, thereby optimizing the data transmission path.

Third Embodiment

Figure 3:
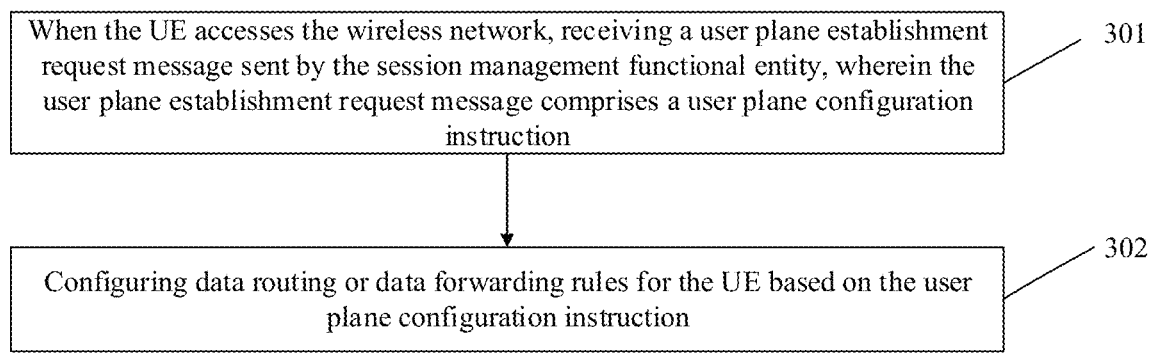
FIG. 3 is a flowchart of a method for establishing connection according to a third embodiment of the present disclosure.

As shown in FIG. 3, a method for establishing connection according to a third embodiment of the present disclosure is applied to a user plane anchor, such as an UP-GW functional entity. The user plane anchor is selected by a mobility management functional entity based on acquired path selection reference information when a UE accesses a wireless network. Alternatively, the user plane anchor is selected by a session management functional entity based on information related to session management of the mobility management functional entity. The method includes steps 301 and 302.

In step 301, when a user equipment (UE) accesses a wireless network, a user plane establishment request message sent by the session management functional entity is received. The user plane establishment request message includes the user plane configuration instruction.

In step 302, data routing or data forwarding rules are configured for the UE based on the user plane configuration instruction.

It can be seen from the above that in the embodiment of the present disclosure, when the UE accesses the wireless network, path selection reference information is acquired, and a session management functional entity and/or a user plane anchor are selected for the UE based on the path selection reference information. In the embodiment of the present disclosure, the path selection reference information is taken into consideration when selecting the SM functional entity. Therefore, the selected SM functional entity can better meet a requirement of path optimization, thereby optimizing the data transmission path.

In the following fourth embodiment to seventh embodiment, the MM functional entity serves as the mobility management entity, the SM functional entity serves as the session management functional entity, and the UP-GW functional entity serves as the user plane anchor. In this situation, specific attach and detach processes of the UE are described below.

In the fourth embodiment to the sixth embodiment, the MM functional entity determines the SM functional entity and/or the UP-GW functional entity respectively in the following manners.

In the fourth embodiment, when the UE is attached to a network, the MM functional entity first selects the SM functional entity, and the SM functional entity selects the UP-GW functional entity.

Specifically, the MM obtains subscription information (such as user attributes, required bandwidth, application identifier, and other auxiliary information facilitating selection of the SM functional entity) of the user based on information carried in an attach request message, and then selects an appropriate SM functional entity in combination with path optimization reference information (such as DNS, off-load capability of a local service center). The SM functional entity selects an appropriate user plane, allocates an IP address, and creates a UE context for the UE, based on SM related information sent by the MM functional entity.

In the fifth embodiment, the UE is attached to a network, and the MM functional entity first selects the UP-GW functional entity, and then selects the SM functional entity.

Specifically, the MM functional entity acquires subscription information (such as user attributes, required bandwidth, application identifier, and other auxiliary information facilitating selection of the user plane anchor) of the user based on information carried in an attach request message, and then selects an appropriate user plane anchor in combination with path optimization reference information (such as DNS, off-load capability of a local service center). Then, the MM functional entity selects the SM functional entity based on information about the user plane anchor, such as location information. The SM functional entity allocates an IP address and creates a UE context for the UE, based on SM related information and information about the user plane anchor sent by the MM functional entity.

In the sixth embodiment, the UE is attached to a network, and the MM functional entity selects both the SM functional entity and the UP-GW functional entity.

Specifically, the MM functional entity acquires subscription information (such as user attributes, required bandwidth, application identifier, and other auxiliary information facilitating selection of the SM functional entity) of the user based on information carried in an attach request message, and then selects both an appropriate SM functional entity and an appropriate user plane anchor in combination with path optimization reference information (such as DNS, off-load capability of a local service center). The SM functional entity allocates an IP address and creates a UE context for the UE, based on SM related information and information about the user plane anchor sent by the MM functional entity.

Fourth Embodiment

Figure 4:
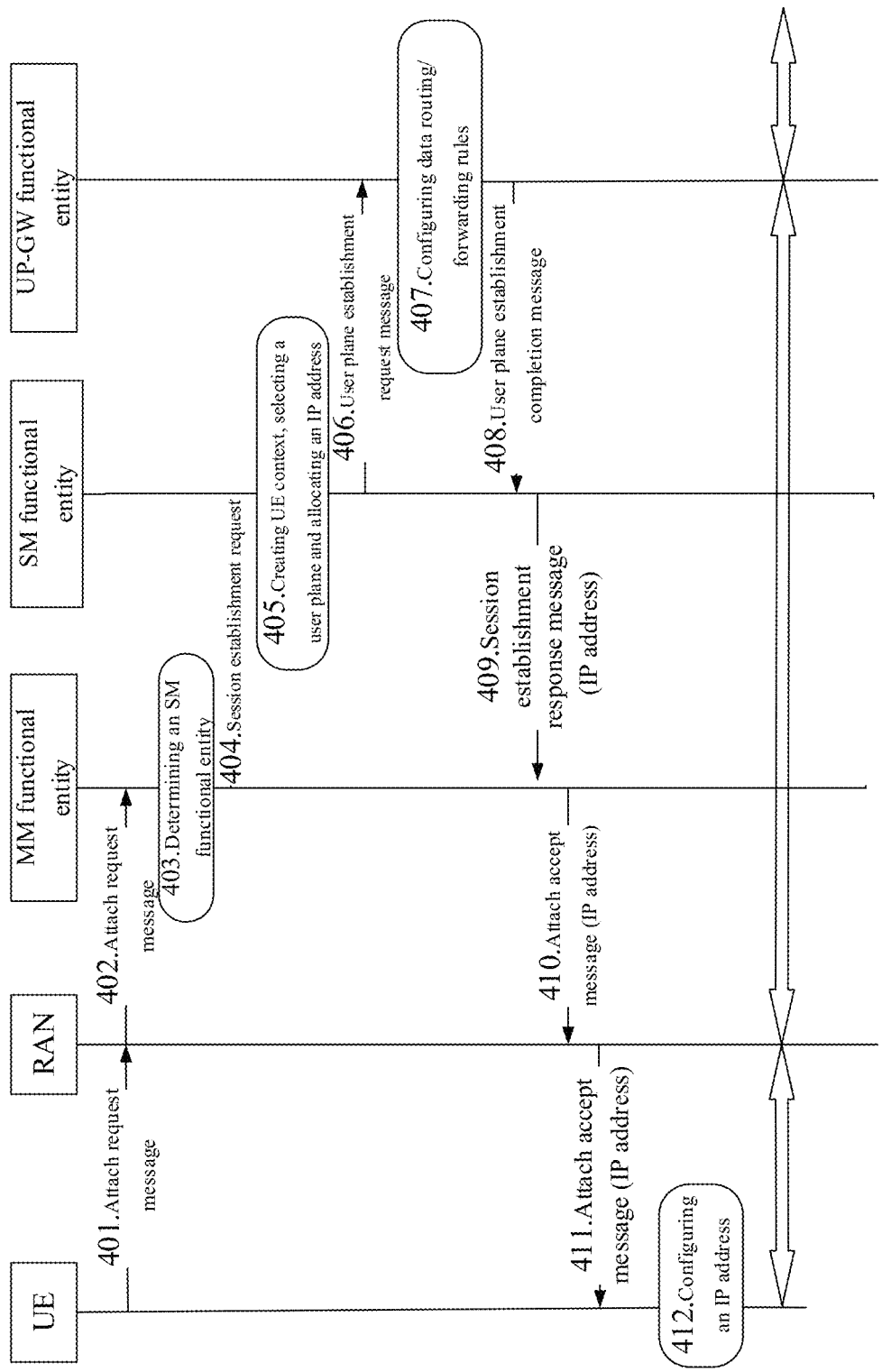
FIG. 4 is a flowchart of a method for establishing connection according to a fourth embodiment of the present disclosure.

As shown in FIG. 4, a method for establishing connection according to a fourth embodiment of the present disclosure includes steps 401 to 412.

In step 401, a UE sends an attach request message to a radio access network (RAN), the request message including a user identifier (user ID).

In step 402, after receiving the attach request message, the RAN adds a base station identifier (BS ID) of a base station to which the UE is currently attached, into the attach request message, and then sends the attach request message to an MM functional entity, the attach request message including the user ID and the BS ID.

In step 403, after receiving the attach request message sent by the UE, the MM functional entity stores or updates location information of the UE based on the BS ID. The MM functional entity acquires subscription information (such as user attributes, required bandwidth, application identifier, and other auxiliary information facilitating selection of an SM functional entity) of the user based on information (such as the user ID) carried in the attach request message, and then selects an appropriate SM functional entity in combination with path optimization reference information (such as DNS, off-load capability of a local service center).

In step 404, the MM functional entity sends a session establishment request to the selected SM functional entity, to request the selected SM functional entity to establish a session for the UE, and sends SM related information to the SM functional entity.

In step 405, the SM functional entity selects an appropriate user plane (UP, including a user plane anchor), allocates an IP address, and creates a UE context for the UE, based on the SM related information of the user. At the same time, a user plane configuration instruction is generated.

In step 406, the SM functional entity sends a user plane establishment request message to the selected UP-GW functional entity. The user plane configuration instruction is carried in the user plane establishment request message.

In step 407, the selected UP-GW functional entity configures data routing/forwarding rules based on the user plane configuration instruction.

In step 408, after the configuration is completed, the UP-GW functional entity sends a user plane establishment completion message to the SM functional entity.

In step 409, the SM functional entity sends a session establishment response message to the MM functional entity. The carried message contains the IP address of the UE.

In step 410, after receiving the session establishment response message, the MM functional entity sends an attach accept message to the RAN. The carried message contains the IP address of the UE.

In step 411, the RAN sends the attach accept message to the UE. The message includes the IP address of the UE.

In step 412, after receiving the attach accept message, the UE configures an IP address based on the IP address carried in the attach accept message.

It can be seen from the above that in the embodiment of the present disclosure, when the UE accesses a wireless network, path selection reference information is acquired, and a session management functional entity and/or a user plane anchor are selected for the UE based on the path selection reference information. In the embodiment of the present disclosure, the path selection reference information is taken into consideration when selecting the SM functional entity, and the selected SM functional entity better meets a requirement of path optimization, thereby optimizing the data transmission path, and meanwhile meeting a requirement of the UE on the quality of service (QoS), and a bandwidth requirement of the user. Since the user attributes are also taken into consideration, the type of the UE can be determined, and further an appropriate service is provided to the UE. Moreover, the off-load capability of the local service center is also taken into consideration when selecting the SM functional entity, thereby alleviating pressure on the core network.

Fifth Embodiment

Figure 5:
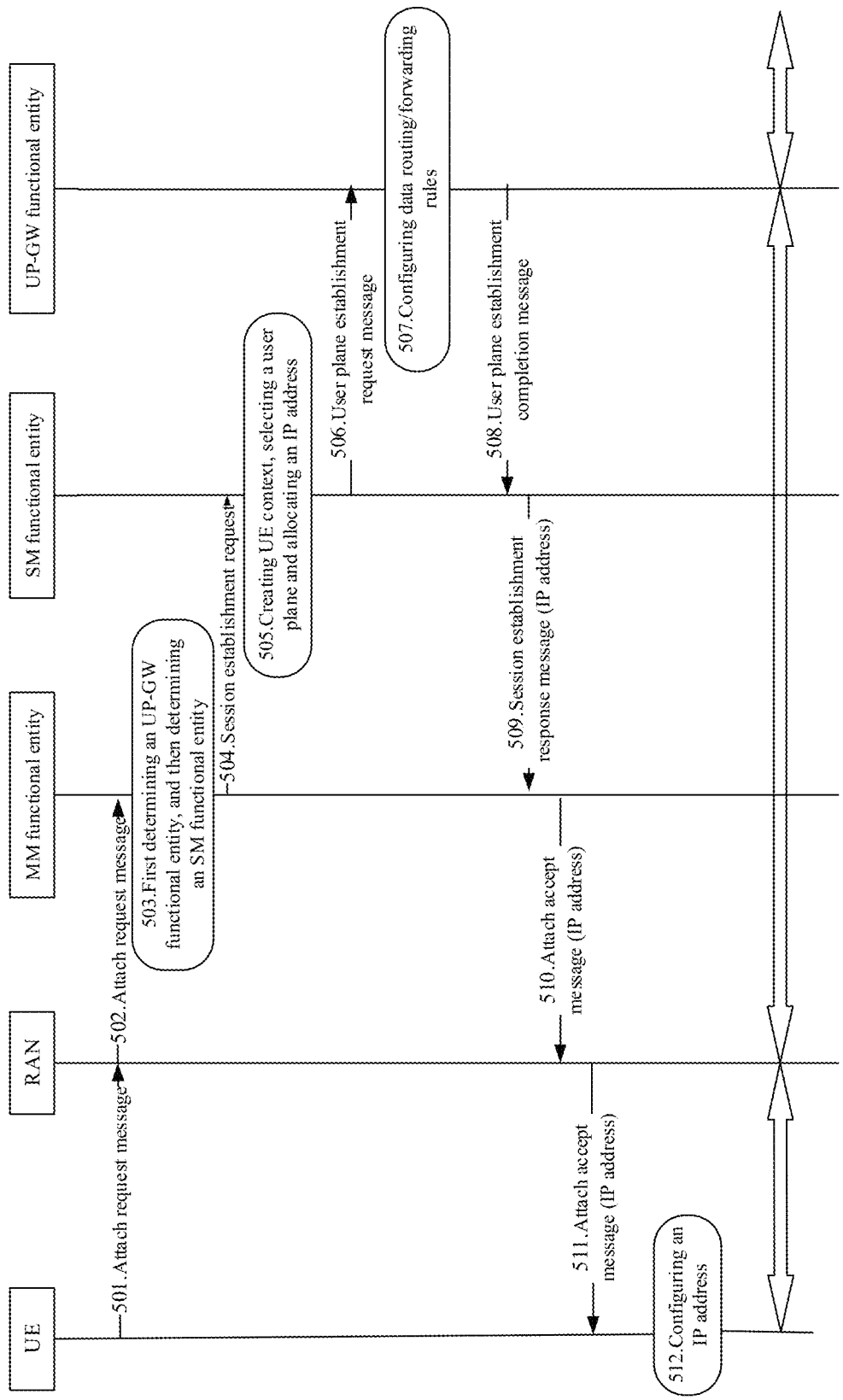
FIG. 5 is a flowchart of a method for establishing connection according to a fifth embodiment of the present disclosure.

As shown in FIG. 5, a method for establishing connection according to a fifth embodiment of the present disclosure includes steps 501 to 512:

In step 501, a UE sends an attach request message to a radio access network (RAN), the request message including a user identifier (user ID).

In step 502, after receiving the attach request message, the RAN adds a base station identifier (BS ID) of a base station to which the UE is currently attached, into the attach request message, and then sends the attach request message to an MM functional entity, the attach request message including the user ID and the BS ID.

In step 503, after receiving the attach request message sent by the UE, the MM functional entity stores or updates location information of the UE based on the BS ID. The MM functional entity acquires subscription information (such as user attributes, required bandwidth, application identifier, and other auxiliary information facilitating selection of an UP-GW) of the user based on information (such as the user ID) carried in the attach request message, and then selects an appropriate UP-GW functional entity in combination with path optimization reference information (such as DNS, off-load capability of a local service center). Then, the MM functional entity selects an SM functional entity based on information on the UP-GW functional entity, such as location information.

In step 504, the MM functional entity sends a session establishment request to the selected SM functional entity, to request the selected SM functional entity to establish a session for the UE, and sends SM related information to the SM functional entity.

In step 505, the SM functional entity allocates an IP address and creates a UE context for the UE based on the subscription information of the user. At the same time, a user plane configuration instruction is generated.

In step 506, the SM functional entity sends a user plane establishment request message to the UP-GW functional entity selected by the MM functional entity. The user plane configuration instruction is carried in the user plane establishment request message.

In step 507, the selected UP-GW functional entity configures data routing/forwarding rules based on the user plane configuration instruction.

In step 508, after the configuration is completed, the UP-GW functional entity sends a user plane establishment completion message to the SM functional entity.

In step 509, the SM functional entity sends a session establishment response message to the MM functional entity. The carried message contains the IP address of the UE.

In step 510, after receiving the session establishment response message, the MM functional entity sends an attach accept message to the RAN. The carried message contains the IP address of the UE.

In step 511, the RAN sends the attach accept message to the UE. The message includes an IP address of the UE.

In step 512, after receiving the attach accept message, the UE configures an IP address based on the IP address carried in the attach accept message.

It can be seen from the above that in the embodiment of the present disclosure, when the UE accesses a wireless network, path selection reference information is acquired, and a session management functional entity and/or a user plane anchor are selected for the UE based on the path selection reference information. In the embodiment of the present disclosure, the path selection reference information is taken into consideration when selecting the SM functional entity, and the selected SM functional entity better meets a requirement of path optimization, thereby optimizing the data transmission path, and meanwhile meeting a requirement of the UE on the quality of service, and a bandwidth requirement of the user. Since the user attributes are also taken into consideration, the type of the UE can be determined, and an appropriate service is further provided to the UE. Moreover, the off-load capability of the local service center is also taken into consideration when selecting the SM functional entity, thereby alleviating pressure on the core network.

Sixth Embodiment

Figure 6:
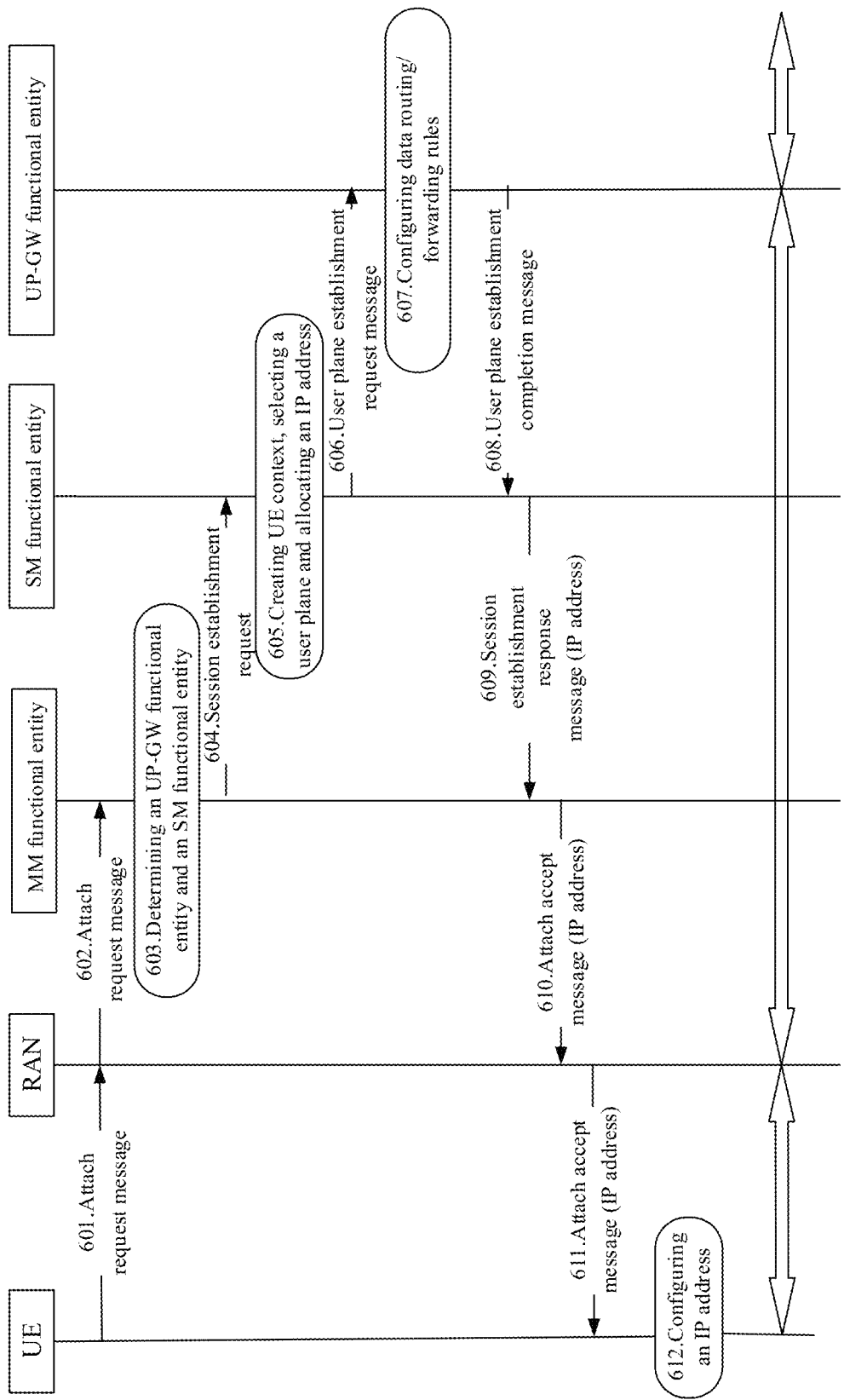
FIG. 6 is a flowchart of a method for establishing connection according to a sixth embodiment of the present disclosure.

As shown in FIG. 6, a method for establishing connection according to a sixth embodiment of the present disclosure includes steps 601 to 612.

In step 601, a UE sends an attach request message to a radio access network (RAN), the request message including a user identifier (user ID).

In step 602, after receiving the attach request message, the RAN adds a base station identifier (BS ID) of a base station to which the UE is currently attached, into the attach request message, and then sends the attach request message to an MM functional entity, the attach request message including the user ID and the BS ID.

In step 603, after receiving the attach request message sent by the UE, the MM functional entity stores or updates location information of the UE based on the BS ID. The MM functional entity acquires subscription information (such as user attributes, required bandwidth, application identifier, and other auxiliary information facilitating selection of an SM functional entity) of the user based on information (such as the user ID) carried in the attach request message, and then selects an appropriate SM functional entity and an appropriate UP-GW functional entity in combination with path optimization reference information (such as DNS, off-load capability of a local service center).

In step 604, the MM functional entity sends a session establishment request to the selected SM functional entity, to request the selected SM functional entity to establish a session for the UE, and sends SM related information to the SM functional entity.

In step 605, the SM functional entity selects an appropriate user plane (UP, including a user plane anchor), allocates an IP address, and creates a UE context for the UE based on the SM related information of the user. At the same time, a user plane configuration instruction is generated.

In step 606, the SM functional entity sends a user plane establishment request message to the selected UP-GW functional entity. The user plane configuration instruction is carried in the user plane establishment request message.

In step 607, the selected UP-GW functional entity configures data routing/forwarding rules based on the user plane configuration instruction.

In step 608, after the configuration is completed, the UP-GW functional entity sends a user plane establishment completion message to the SM functional entity.

In step 609, the SM functional entity sends a session establishment response message to the MM functional entity. The carried message contains the IP address of the UE.

In step 610, after receiving the session establishment response message, the MM functional entity sends an attach accept message to the RAN. The carried message contains the IP address of the UE.

In step 611, the RAN sends the attach accept message to the UE. The message includes an IP address of the UE.

In step 612, after receiving the attach accept message, the UE configures an IP address based on the IP address carried in the attach accept message.

It can be seen from the above that in the embodiment of the present disclosure, when the UE accesses a wireless network, path selection reference information is acquired, and a session management functional entity and/or a user plane anchor are selected for the UE based on the path selection reference information. In the embodiment of the present disclosure, the path selection reference information is taken into consideration when selecting the SM functional entity, and the selected SM functional entity better meets a requirement of path optimization, thereby optimizing the data transmission path, and meanwhile meeting a requirement of the UE on the quality of service (QoS), and a bandwidth requirement of the user. Since the user attributes are also taken into consideration, the type of the UE can be determined, and an appropriate service is further provided to the UE. Moreover, the off-load capability of the local service center is also taken into consideration when selecting the SM functional entity, thereby alleviating pressure on the core network.

Seventh Embodiment

Figure 7:
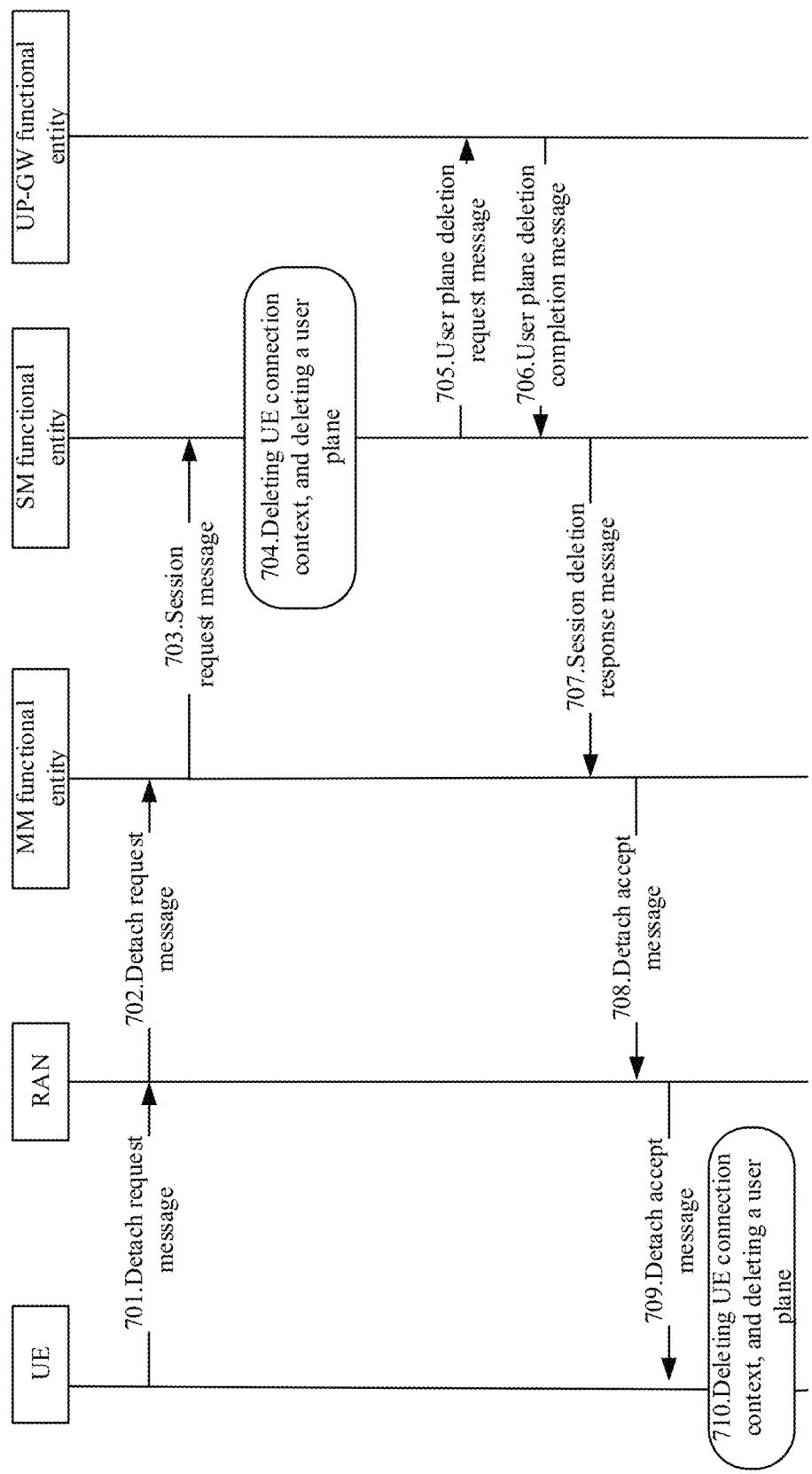
FIG. 7 is a flowchart of a method for establishing connection according to a seventh embodiment of the present disclosure.

On the basis of any of the above embodiments, as shown in FIG. 7, a seventh embodiment of the present disclosure may further include a detach process of UE. The seventh embodiment of the present disclosure includes steps 701 to 710.

In step 701, a UE sends a detach request message to an RAN, the detach request message including a user ID.

In step 702, after receiving the detach request message, the RAN sends the detach request message to an MM functional entity, the detach request message including the user ID.

In step 703, after receiving the attach request message sent by the UE, the MM functional entity sends a session deletion request message to an SM functional entity.

In step 704, after receiving the session deletion request message, the SM functional entity deletes information on the UE context including the IP address of the UE, and deletes a user plane.

In step 705, the SM functional entity sends a user plane deletion request message to the UP-GW functional entity.

In step 706, the UP-GW functional entity deletes a user plane based on the user plane deletion request message, and sends a user plane deletion completion message to the SM functional entity.

In step 707, the SM functional entity sends a session deletion response message to the MM functional entity.

In step 708, after receiving the session deletion response message, the MM functional entity sends a detach accept message to the RAN, and deletes a signaling connection.

In step 709, the RAN sends the detach accept message to the UE, and deletes the signaling connection.

In step 710, the UE deletes the signaling connection after receiving the detach accept message.

It can be seen from the above that in the embodiment of the present disclosure, when the UE accesses a wireless network, path selection reference information is acquired, and a session management functional entity and/or a user plane anchor are selected for the UE based on the path selection reference information. In the embodiment of the present disclosure, the path selection reference information is taken into consideration when selecting the SM functional entity, and the selected SM functional entity better meets a requirement of path optimization, thereby optimizing the data transmission path, and meanwhile meeting a requirement of the UE on the quality of service, and a bandwidth requirement of the user. Since the user attributes are also taken into consideration, the type of the UE can be determined, and an appropriate service is further provided to the UE. Moreover, the off-load capability of the local service center is also taken into consideration when selecting the SM functional entity, thereby alleviating pressure on the core network.

Eighth Embodiment

Figure 8:
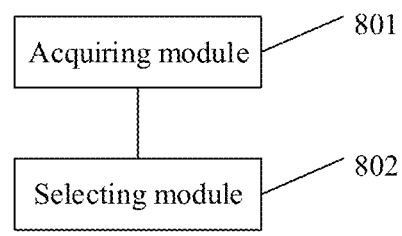
FIG. 8 is a schematic diagram showing a device for establishing connection according to an eighth embodiment of the present disclosure.

As shown in FIG. 8, a device for establishing connection according to an eighth embodiment of the present disclosure is arranged in a mobility management functional entity, and includes an acquiring module 801 and a selecting module 802.

The acquiring module 801 is configured to acquire path selection reference information when a user equipment (UE) accesses a wireless network. The selecting module 802 is configured to select a session management functional entity and/or a user plane anchor for the UE based on the path selection reference information.

The path selection reference information includes path optimization reference information, or the path selection reference information includes path optimization reference information and user subscription information.

In a case that the path selection reference information includes the path optimization reference information, the acquiring module 801 is specifically configured to acquire the path optimization reference information of a network to be accessed by the UE.

In a case that the path selection reference information includes the path optimization reference information and the user subscription information, the acquiring module 801 includes: a receiving submodule configured to receive an attach request message from the UE; a first acquiring submodule configured to acquire user subscription information of the UE based on the attach request message; and a second acquiring submodule configured to acquire the path optimization reference information of a network to be accessed by the UE.

The selecting module 802 is configured to:

select the session management functional entity for the UE based on the path selection reference information; or select the user plane anchor for the UE based on the path selection reference information, and select the session management functional entity based on the information about the user plane anchor; or select both the user plane anchor and the session management functional entity for the UE based on the path selection reference information.

Figure 9:
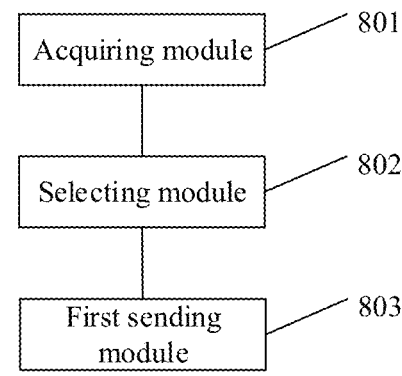
FIG. 9 is another schematic diagram showing a device for establishing connection according to the eighth embodiment of the present disclosure.

As shown in FIG. 9, the device further includes a first sending module 803.

The first sending module 803 is configured to: send information related to session management to the session management functional entity; or send the information related to session management and information about the user plane anchor to the session management functional entity. The session management functional entity is configured to select the user plane anchor for the UE based on the information about the user plane anchor, and establish a session connection for the UE based on the information related to session management.

Figure 10:
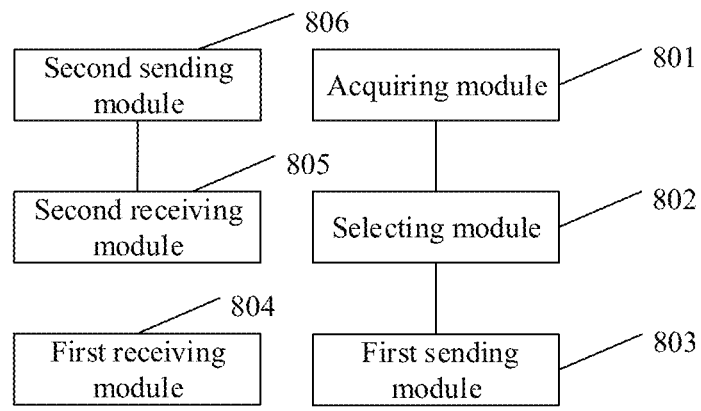
FIG. 10 is further another schematic diagram showing a device for establishing connection according to the eighth embodiment of the present disclosure.

As shown in FIG. 10, the device further includes a first receiving module 804.

The first receiving module 804 is configured to receive a session establishment response message sent by the session management functional entity. The first sending module 803 is further configured to send an attach accept message to the UE.

As shown in FIG. 10, the device further includes a second receiving module 805 and a second sending module 806.

The second receiving module 805 is configured to receive a detach request message from the UE. The second sending module 806 is configured to send a session deletion request message to the session management functional entity based on the detach request message. The second receiving module is further configured to receive a session deletion response message sent by the session management functional entity. The second sending module is further configured to send a detach accept message to the UE based on the session deletion response message, and delete a signaling connection with the UE.

For the operational principle of the device in the present disclosure, reference may be made to the description of the above method embodiments.

As can be seen from the above, in the embodiment of the present disclosure, when the UE accesses a wireless network, path selection reference information is acquired, and a session management functional entity and/or a user plane anchor are selected for the UE based on the path selection reference information. In the embodiment of the present disclosure, the path selection reference information is taken into consideration when selecting the SM functional entity, and the selected SM functional entity better meets a requirement of path optimization, thereby optimizing the data transmission path, and meanwhile meeting a requirement of the UE on the quality of service.

Ninth Embodiment

Figure 11:
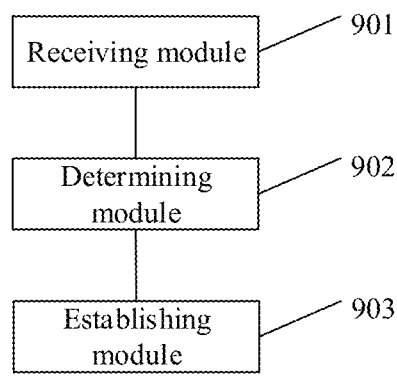
FIG. 11 is a schematic diagram showing a device for establishing connection according to a ninth embodiment of the present disclosure.

As shown in FIG. 11, a device for establishing connection according to a ninth embodiment of the present disclosure is arranged in a session management functional entity, wherein the session management functional entity is selected by a mobility management functional entity based on acquired path selection reference information when a user equipment (UE) accesses a wireless network. The device includes a receiving module 901, a determining module 902 and an establishing module 903.

The receiving module 901 is configured to receive information related to session management sent by the mobility management functional entity. The determining module 902 is configured to determine a user plane anchor for the UE being about to access the network. The establishing module 903 is configured to establish a session connection for the UE based on the information related to session management.

The determining module 902 is specifically configured to:

determine a user plane anchor for the UE based on the information related to session management; or receive information about a user plane anchor sent by the mobility management functional entity, and determine the user plane anchor for the UE based on the information about the user plane anchor.

The establishing module 903 includes a configuring submodule and a sending submodule.

The configuring submodule is configured to allocate an Internet Protocol (IP) address, create a UE context for the UE, and generate a user plane configuration instruction, based on the information related to session management. The sending submodule is configured to send a user plane establishment request message to the user plane anchor, wherein the user plane establishment request message includes the user plane configuration instruction, and the user plane anchor configures data routing or data forwarding rules based on the user plane configuration instruction.

Figure 12:
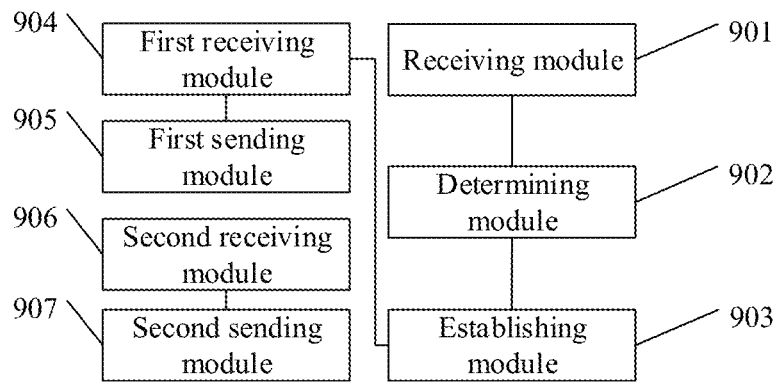
FIG. 12 is another schematic diagram showing a device for establishing connection according to the ninth embodiment of the present disclosure.

As shown in FIG. 12, the device further includes a first receiving module 904 and a first sending module 905.

The first receiving module 904 is configured to receive a user plane establishment completion message sent by the user plane anchor. The first sending module 905 is configured to send a session establishment response message to the mobility management functional entity.

As shown in FIG. 12, the device further includes: a second receiving module 906 configured to receive a session deletion request message sent by the mobility management functional entity; and a second sending module 907 configured to delete information on the UE context based on the session deletion request message, and send a user plane deletion request message to the user plane anchor. The second receiving module 905 is further configured to receive a user plane deletion completion message sent by the user plane anchor. The second sending module 906 is further configured to send a session deletion response message to the mobility management functional entity based on the user plane deletion completion message.

For the operational principle of the device in the present disclosure, reference may be made to the description of the above method embodiments.

As can be seen from the above, in the embodiment of the present disclosure, when the UE accesses a wireless network, path selection reference information is acquired, and a session management functional entity and/or a user plane anchor are selected for the UE based on the path selection reference information. In the embodiment of the present disclosure, the path selection reference information is taken into consideration when selecting the SM functional entity, and the selected SM functional entity better meets a requirement of path optimization, thereby optimizing the data transmission path, and meanwhile meeting a requirement of the UE on the quality of service.

Tenth Embodiment

Figure 13:
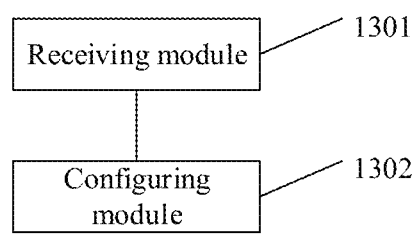
FIG. 13 is a schematic diagram showing a device for establishing connection according to a tenth embodiment of the present disclosure.

As shown in FIG. 13, a device for establishing connection according to a tenth embodiment of the present disclosure is arranged at a user plane anchor. The user plane anchor is selected by a mobility management functional entity based on acquired path selection reference information when a user equipment (UE) accesses a wireless network; or the user plane anchor is selected by a session management functional entity based on information related to session management sent from the mobility management functional entity. The device includes a receiving module 1301 and a configuring module 1302.

The receiving module 1301 is configured to receive, when the UE accesses the wireless network, a user plane establishment request message sent by the session management functional entity, wherein the user plane establishment request message includes a user plane configuration instruction. The configuring module 1302 is configured to configure data routing or data forwarding rules for the UE based on the user plane configuration instruction.

Figure 14:
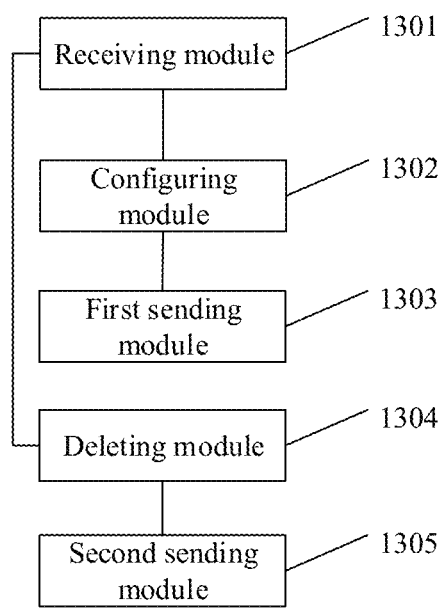
FIG. 14 is another schematic diagram showing a device for establishing connection according to the tenth embodiment of the present disclosure.

As shown in FIG. 14, the device further includes a first sending module 1303.

The first sending module 1303 is configured to send a user plane establishment completion message to the session management functional entity.

The receiving module 1301 is further configured to receive a user plane deletion request message sent by the session management functional entity. As shown in FIG. 14, the device further includes: a deleting module 1304 configured to delete a user plane based on the user plane deletion request message; and a second sending module 1305 configured to send a user plane deletion completion message to the session management functional entity.

For the operational principle of the device in the present disclosure, reference may be made to the description of the above method embodiments.

As can be seen from the above, in the embodiment of the present disclosure, when the UE accesses a wireless network, path selection reference information is acquired, and a session management functional entity and/or a user plane anchor are selected for the UE based on the path selection reference information. In the embodiment of the present disclosure, the path selection reference information is taken into consideration when selecting the SM functional entity, and the selected SM functional entity better meets a requirement of path optimization, thereby optimizing the data transmission path, and meanwhile meeting a requirement of the UE on quality of service.

A data processing device is provided according to an eleventh embodiment of the present disclosure, which includes a processor and a storage connected to the processor through a bus interface. The storage is configured to store a program and data used by the processor when executing an operation. When the processor calls and executes the program and data stored in the storage, the processor includes the following functional modules or units:

an acquiring module, which is configured to acquire path selection reference information when a user equipment (UE) accesses a wireless network; and a selecting module, which is configured to select a session management functional entity and/or a user plane anchor for the UE based on the path selection reference information.

A data processing device is provided according to a twelfth embodiment of the present disclosure, which includes a processor and a storage connected to the processor through a bus interface. The storage is configured to store a program and data used by the processor when executing an operation. When the processor calls and executes the program and data stored in the storage, the processor includes the following functional modules or units:

a receiving module which is configured to receive information related to session management sent by the mobility management functional entity;

a determining module which is configured to determine a user plane anchor for the UE being about to access the network; and an establishing module which is configured to establish a session connection for the UE based on the information related to session management.

A data processing device is provided according to a thirteenth embodiment of the present disclosure, which includes a processor and a storage connected to the processor through a bus interface. The storage is configured to store a program and data used by the processor when executing an operation. When the processor calls and executes the program and data stored in the storage, the processor includes the following functional modules or units:

a receiving module which is configured to, when the UE accesses the wireless network, receive a user plane establishment request message sent by the session management functional entity, wherein the user plane establishment request message includes a user plane configuration instruction; and a configuring module which is configured to configure data routing or data forwarding rules for the UE based on the user plane configuration instruction.

It should be noted that the devices provided in the eleventh, twelfth, and thirteenth embodiments of the present disclosure are devices for establishing connection capable of implementing the foregoing method embodiments, and therefore all the embodiments of the method for establishing connection provided by the foregoing method embodiments can be correspondingly applied to the eleventh, twelfth and thirteenth embodiments, while also achieving the same or similar advantageous effects.

In the several embodiments provided by the present disclosure, it should be understood that the disclosed method and device may be implemented in other manners. For example, the device embodiments described above are merely illustrative. For example, the division of the units is only a division in terms of logical function. In actual implementation, there may also be other division manners; for example, multiple units or components may be combined or integrated into another system, or some features can be omitted or not executed. In addition, the mutual coupling or direct coupling or communication connection as shown or discussed may be an indirect coupling or communication connection through some interfaces, devices or units, and may be in electrical, mechanical or other forms.

In addition, individual functional units in various embodiments of the present disclosure may be integrated into one processing unit, or individual units may be physically included separately, or two or more units may be integrated into one unit. The above integrated unit can be implemented in the form of hardware or in the form of hardware plus software functional units.

The above described integrated unit implemented in the form of a software functional unit can be stored in a computer readable storage medium. The software functional unit is stored in a storage medium which includes a plurality of instructions for causing a computer device (which may be a personal computer, a server, or a network device, etc.) to execute all or part of the steps of the methods of the various embodiments of the present disclosure. The foregoing storage medium includes: a U disk, a mobile hard disk, a Read-Only Memory (ROM), a Random Access Memory (RAM), a magnetic disk or an optical disk, and various media that can store program codes thereon.

Described above are optional embodiments of the present disclosure, and it should be noted that those skilled in the art can also make several improvements and modifications without departing from the principles of the present disclosure, which will also fall within the scope of protection of the present disclosure.

What is claimed is:

1. A method for establishing connection, the method being applied to a mobility management functional entity and comprising:

acquiring path selection reference information when a user equipment (UE) accesses a wireless network; and selecting a user plane anchor for the UE based on the path selection reference information, and selecting a session management functional entity based on information about the user plane anchor, wherein the path selection reference information comprises path optimization reference information of the wireless network, the path optimization reference information comprises domain name system (DNS) information and off-load capability of a local service center.

2. The method according to claim 1, wherein the path selection reference information further comprises user subscription information.

3. The method according to claim 2, wherein the step of acquiring the path selection reference information comprises:
receiving an attach request message from the UE;
acquiring the user subscription information of the UE based on the attach request message; and
acquiring the path optimization reference information.

4. The method according to claim 2, wherein the user subscription information comprises:
one or more of a user attribute, a required bandwidth, an application identifier, auxiliary information facilitating selection of the session management functional entity, and auxiliary information facilitating selection of the user plane anchor.

5. The method according to claim 1, further comprising:
sending information related to session management and information about the user plane anchor to the session management functional entity, wherein the session management functional entity determines the user plane anchor for the UE based on the information about the user plane anchor, and establishes a session connection for the UE based on the information related to session management.

6. The method according to claim 5, further comprising:
receiving a session establishment response message sent by the session management functional entity; and
sending an attach accept message to the UE.

7. The method according to claim 1, further comprising:
receiving a detach request message from the UE;
sending a session deletion request message to the session management functional entity based on the detach request message;
receiving a session deletion response message sent by the session management functional entity; and
sending a detach accept message to the UE based on the session deletion response message, and deleting a signaling connection with the UE.

8. A method for establishing connection, the method being applied to a session management functional entity, the session management functional entity being selected by a mobility management functional entity based on information of a selected user plane anchor when a user equipment (UE) accesses a wireless network, the method comprising:
receiving information related to session management sent by the mobility management functional entity;
determining a user plane anchor for the UE being about to access the wireless network; and
establishing a session connection for the UE based on the information related to session management,
wherein the user plane anchor is selected by the mobility management functional entity based on acquired path selection reference information, the path selection reference information comprises path optimization reference information of the wireless network, the path optimization reference information comprises domain name system (DNS) information and off-load capability of a local service center.

9. The method according to claim 8, wherein the step of determining a user plane anchor for the UE being about to access the wireless network comprises:
receiving the information about the user plane anchor sent by the mobility management functional entity, and determining the user plane anchor for the UE based on the information about the user plane anchor.

10. The method according to claim 8, wherein the step of establishing a session connection for the UE based on the information related to session management comprises:
allocating an Internet Protocol (IP) address, creating a UE context for the UE, and generating a user plane configuration instruction, based on the information related to session management; and
sending a user plane establishment request message to the user plane anchor, wherein the user plane establishment request message comprises the user plane configuration instruction, and the user plane anchor configures data routing or data forwarding rules based on the user plane configuration instruction.

11. The method according to claim 10, further comprising:
receiving a user plane establishment completion message sent by the user plane anchor; and
sending a session establishment response message to the mobility management functional entity.

12. The method according to claim 8, further comprising:
receiving a session deletion request message sent by the mobility management functional entity;
deleting information on the UE context based on the session deletion request message, and sending a user plane deletion request message to the user plane anchor;
receiving a user plane deletion completion message sent by the user plane anchor; and
sending a session deletion response message to the mobility management functional entity based on the user plane deletion completion message.

13. A method for establishing connection, the method being applied to a user plane anchor, the user plane anchor being selected by a mobility management functional entity based on acquired path selection reference information when a user equipment (UE) accesses a wireless network, the method comprising:
when the UE accesses the wireless network, receiving a user plane establishment request message sent by a session management functional entity, wherein the session management functional entity is selected by the mobility management functional entity based on information of the selected user plane anchor, and the user plane establishment request message comprises a user plane configuration instruction; and
configuring data routing or data forwarding rules for the UE based on the user plane configuration instruction,
wherein the path selection reference information comprises path optimization reference information of the wireless network, the path optimization reference information comprises domain name system (DNS) information and off-load capability of a local service center.

14. The method according to claim 13, further comprising:
sending a user plane establishment completion message to the session management functional entity.

15. The method according to claim 13, further comprising:
receiving a user plane deletion request message sent by the session management functional entity;

deleting a user plane based on the user plane deletion request message; and sending a user plane deletion completion message to the session management functional entity.

16. A device for establishing connection, the device being arranged in a mobility management functional entity, the device comprising a processor and a storage, wherein the processor is configured to execute a computer program stored in the storage so as to:

perform steps of the method according to claim 1.

17. A device for establishing connection, the device being arranged in a session management functional entity, the session management functional entity being selected by a mobile management functional entity based on acquired path selection reference information when a user equipment (UE) accesses a wireless network, the device comprising:

a processor and a storage;

wherein the processor is configured to execute a computer program stored in the storage so as to perform steps of the method according to claim 8.

18. A device for establishing connection, the device being arranged in a user plane anchor, the user plane anchor being selected by a mobility management functional entity based on acquired path selection reference information when a user equipment (UE) accesses a wireless network, or the user plane anchor being selected by a session management functional entity based on the information related to session management sent from the mobility management functional entity; the device comprising:

a processor and a storage, wherein the processor is configured to execute a computer program stored in the storage so as to perform steps of the method according to claim 13.

* * * * *